Figure 1:
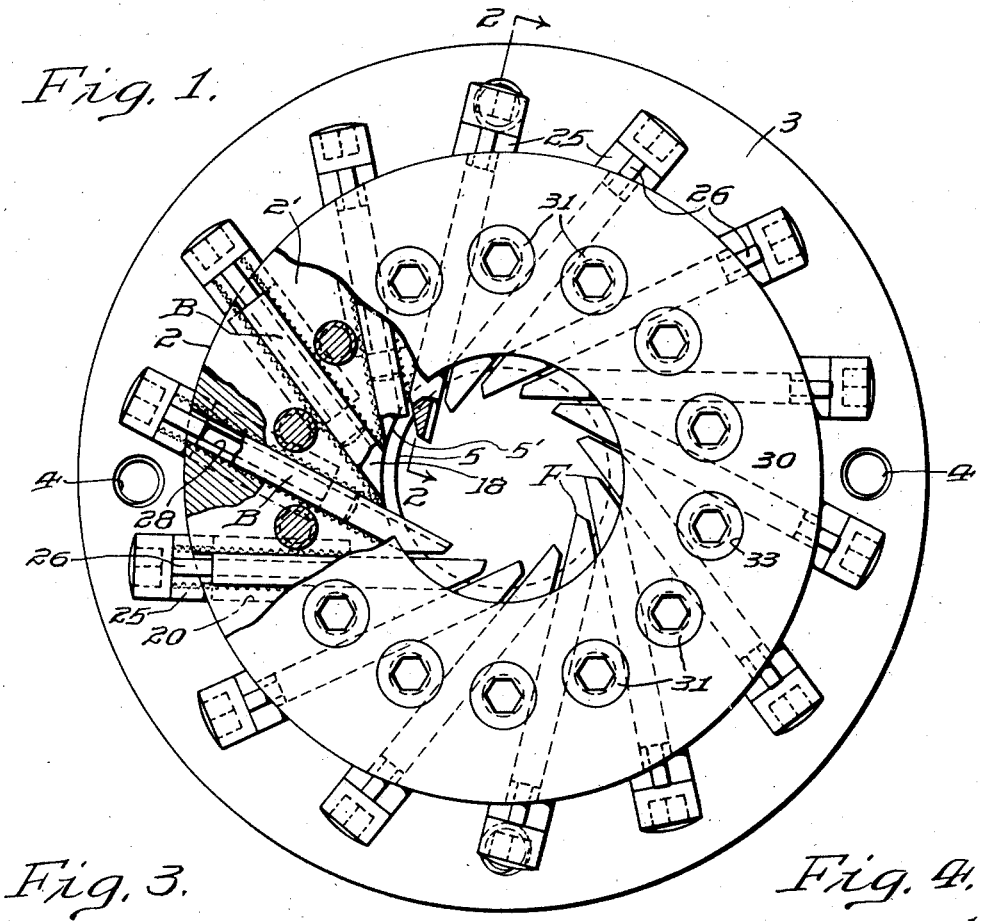

May 1, 1928.  1,668,070
P. P-G. HALL
MILLING CUTTER
Filed Feb. 24, 1923   2 Sheets-Sheet 1

WITNESS
F. J. Hartman.

INVENTOR
Peter P-G. Hall.
BY
ATTORNEYS

May 1, 1928.
P. P-G. HALL
1,668,070
MILLING CUTTER
Filed Feb. 24, 1923     2 Sheets-Sheet 2
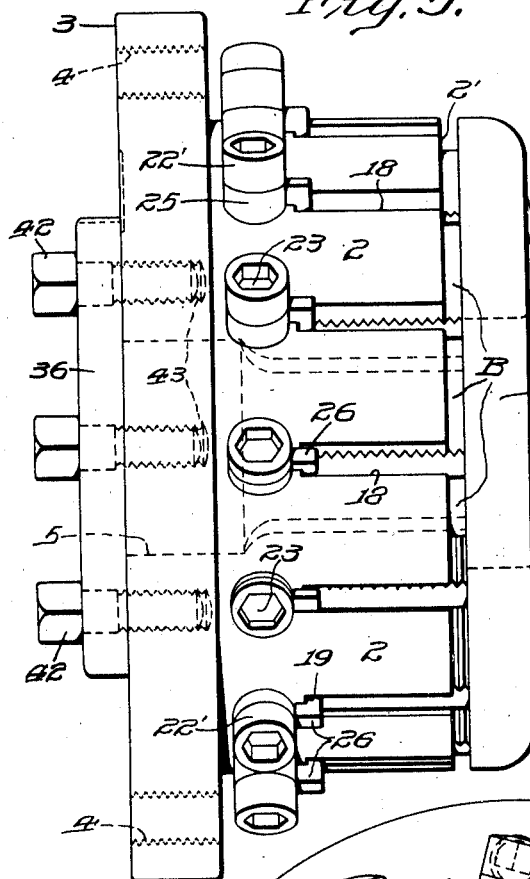
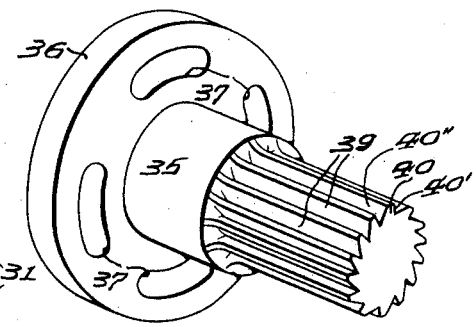
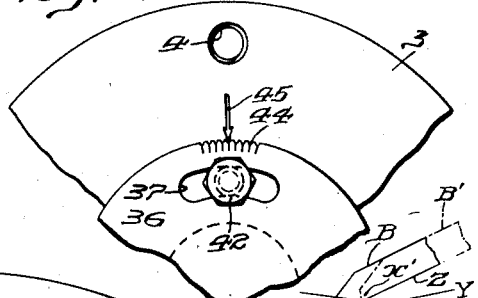
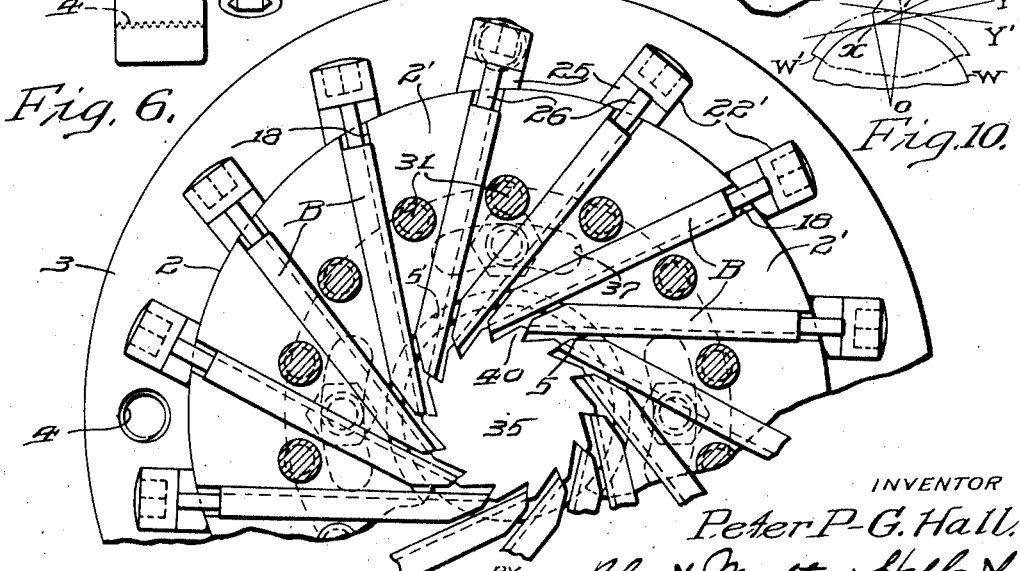
INVENTOR
Peter P-G. Hall
WITNESS
F. J. Hartman
BY
Blount, Moulton & Heilka
ATTORNEYS Patented May 1, 1928.

1,668,070

UNITED STATES PATENT OFFICE.

PETER P-G. HALL, OF PHILADELPHIA, PENNSYLVANIA.

MILLING CUTTER.

Application filed February 24, 1923. Serial No. 620,888.

My invention relates to milling cutters and is particularly adapted for milling threads or performing other milling operations in connection with machines of the general character of that forming the subject of U. S. Letters Patent No. 1,316,718 granted to me September 23, 1919 for planetary metal working machine.

In milling operations it is desirable, in order to enhance rapidity of production, to bring the maximum number of cutting edges into operative engagement with the work in a given period of time, a result which is effected in many of the ordinary types of milling cutters by providing the periphery of the cutter with a plurality of cutting edges or teeth separated by suitable grooves so that as the cutter is revolved the cutting edges are consecutively engaged with the work as the cutter is progressively moved with respect thereto. Although milling cutters are ordinarily made from the highest grades of hardened alloy steel, the cutting edges nevertheless rapidly become dull necessitating re-grinding of the cutter, an operation which results, with the ordinary forms of milling cutters, in reducing the diameter of the cutter so that after each re-grinding it becomes necessary to reset the milling machine in which the cutter is being employed if it be desired to produce a cut of exactly the same depth as that which was produced before the cutter was ground. Moreover, in certain forms of milling cutters where the re-sharpening is effected by grinding back the cutting face, that is, that face of each cutting element or tooth which forms the side of the groove disposed between it and the preceding tooth, the grinding operation results in removing a certain amount of the metal of each tooth in a direction substantially normal to the cutting face and as even in a new cutter the amount of metal in each tooth in the rear of each cutting face is rather limited, and as each sharpening operation diminishes the same by an amount equal to the amount of metal ground off, the life of the cutter is relatively short, for after a certain number of sharpening operations have been performed on the cutter the amount of metal in each tooth becomes insufficient to support the thrust of the work on the cutting face, thus causing the tooth to break off. Moreover, in cutters of this type, that is, those in which the sharpening operation is effected by grinding back the cutting face, the objectionable reduction in diameter of the whole cutter already referred to as resulting from the sharpening operation is also present in addition to the weakening of the tooth, for the reason that properly designed milling cutters are so formed that the metal in the rear of each cutting face "drops off" radially; thus each successive grinding presents a new cutting face of less radial magnitude than the face presented before the grinding with resulting reduction in diameter of the cutter, the effect being thus much the same as in those types of cutters which are designed to be sharpened by grinding the points of the teeth in a plane more or less normal to the cutting faces thereof.

Generally speaking, the present invention contemplates the provision of a milling cutter not open to the objections to which reference has been made and which in addition embodies numerous advantages and improvements over the various forms of cutters hitherto known. More specifically, a principal object of my invention is to provide a milling cutter embodying a plurality of cutting elements arranged for consecutive contact with the work, said elements being so formed and disposed with respect to the means in which they are held for operation and with respect to each other that a maximum number of elements may be utilized in a cutter of given dimensions thereby enhancing the rapidity with which the cutter, when driven at a given speed, can remove a given amount of metal in a given time, or, in other words, enabling maximum rapidity of production by the cutter.

Further objects of the invention are to provide a milling cutter embodying a plurality of independently adjustable cutting elements or blades in association with means for effecting adjustment of the blades when required, as well as means for rigidly clamping the blades in position after adjustment; to provide a milling cutter having a plurality of independent cutting blades arranged about the axis of the cutter and radiating therefrom in a novel manner whereby the cutting edges or faces of the several blades are disposed in relatively close relation while those portions of the blades more remote from the cutting edges are progressively more widely separated from each other and securely supported, thus permitting the utilization of a maximum number of blades in a cutter of given size; to provide a milling cutter comprising a plurality of cutting blades of novel form and which are adapted to be resharpened a relatively great number of times without rendering the blades unsuitable for use by reduction of the amount of metal in the rear of their respective cutting faces to an amount insufficient to resist the thrust induced by the cutting operation, and additionally, to provide a blade which is of simple yet efficient form and which may be manufactured, and resharpened when required, without difficulty or at undue expense, and to provide a milling cutter employing interchangeable blades which may be readily removed from or inserted in the cutter head and in which different forms of blades may be utilized, such, for example, as blades suitable for milling threads, or those suitable for milling plain surfaces.

Still further objects of the invention are to provide a milling cutter in which the angle between the blades and the tangent to the surface of the work at the points at which the blades contact therewith may be varied as desired, thereby permitting adjustment of the clearance between each blade and the work in the rear of the point at which the blade is cutting, since in milling operations and as is well understood by those familiar therewith it is often desirable to vary this clearance when milling different sorts of metal or in accordance with the particular conditions of operation encountered; and to provide a cutter employing a plurality of individual, separated blades each capable of being ground so as to present a cutting face disposed in proper angular relation for maximum efficiency of operation on the metal being cut.

In addition to the foregoing objects and the provision of suitable means and instrumentalities for effecting them, my invention contemplates the utilization of novel means for insuring the proper setting and adjustment of the individual blades, and a further object of the invention is, therefore, to provide means for this purpose and which may be conveniently employed in the operation of setting the blades so as to insure the rapid, accurate and proper positioning thereof to bring about maximum efficiency and rapidity of production in the performance of the intended milling operation.

In addition to the several objects to which reference has been made, my invention further includes all of the various other objects and novel features of construction and arrangement hereinafter more particularly specified and described or which will be apparent from the present specification and the drawings forming a part hereof.

A milling cutter constructed in accordance with my invention and embodying the principles thereof is particularly adapted for milling external threads when actuated through the medium of a machine of the general character of that forming the subject of my said U. S. Letters Patent No. 1,316,718, and for the purpose of enabling those skilled in the art to comprehend and practise the invention, I have illustrated in the accompanying drawings and will now proceed to describe a preferred embodiment thereof which is suitable for use in connection with such a machine for the aforesaid purpose, but it will be understood that I do not thereby desire or intend to limit myself to any particular means or instrumentalities for accomplishing the functions and objects of my invention nor to the use of the invention solely for the purpose of milling threads, as cutters constructed in accordance with the invention may be employed with equal facility in the performance of various other milling operations or with other types of milling machines.

It will be understood that a machine of the general character forming the subject of my said patent is adapted, among other things, to impart rotation about its own axis to a cutter supported in the machine; to impart to the rotating cutter a movement toward the axis of the work upon which the milling operation is to be performed sufficient to bring the blades or teeth of the cutter into the work to the desired depth; and to then effect rotation of the cutter in a planetary orbit about the work and at the same time a longtiudinal movement with respect thereto. Thus, when a machine of this character is provided with a form cutter having a cutting face or faces exhibiting the profile of a plurality of adjacent threads and the machine is operated to impart to the cutter the several movements to which reference has been made, a thread will be formed on a surface of the work by a single revolution of the cutter thereabout, the length of the thread being substantially equal to the width of the cutting element or elements and its pitch being determined by the amount of longitudinal progression imparted to the cutter during a single revolution thereof about the work, it being, of course, understood that the form threads on the cutting elements are without pitch and that if more than one element is employed in the cutter the several elements are arranged to properly and accurately "track" with each other.

With the foregoing brief reference to the manner in which a cutter constructed in accordance with the present invention may be utilized, reference may now be made to the drawings forming a part hereof and in which I have, as aforesaid, illustrated a preferred embodiment of the invention as embodied in a cutter adapted for the production of external threads.

Figure 3:
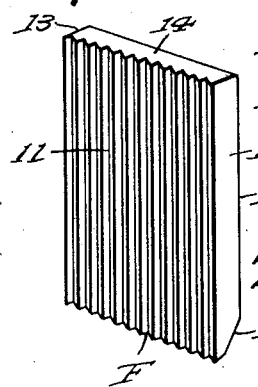
Figure 2:
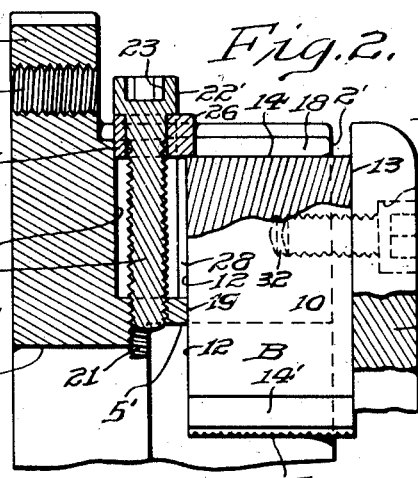
Figure 4:
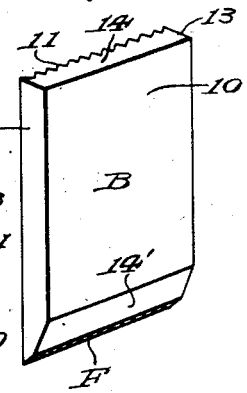

In the said drawings, Fig. 1 is an end elevation of the cutter with the blades assembled and adjusted therein, certain portions of the cutter body and of the blade clamp plate being broken away to better illustrate the construction and arrangement of certain of the parts. Fig. 2 is a fragmentary section on line 2—2 in Fig. 1 looking in the direction of the arrows, and Figs. 3 and 4 are respectively perspective views of one of the cutter blades removed from the cutter. Fig. 5 is a side elevation of the cutter and also showing the setting gauge as used in the operation of setting the cutting blades; Fig. 6 is a fragmentary end elevation of the cutter with the blade clamp plate removed and also showing the end of the setting gauge; Fig. 7 is a perspective view of one of the blade adjusting sleeves; Fig. 8 is a fragmentary rear elevation of a portion of the cutter with the setting gauge in operative position, and Fig. 9 is a perspective view of the gauge removed from the cutter, these two views being on a somewhat reduced scale, while Fig. 10 is a diagrammatic fragmentary view illustrating the manner in which the clearance between the face of a cutter blade and the work in the rear of the cutting point may be varied. Like numerals are used to designate the same parts in the several figures.

The particular embodiment of the invention illustrated comprises a cylindrical cutter body 2 terminating in an outer end or face 2' and at its other or inner end provided with an integral outwardly projecting flange 3 forming a base and having suitably spaced holes 4 for the reception of suitable bolts for clamping the cutter to the face plate, spindle or other suitable part of the machine. The body is provided with a central, cylindrical bore 5 which extends entirely therethrough and is of sufficient size to accommodate the work upon which the milling operation is to be performed. Preferably this bore may be somewhat enlarged in diameter as at 5' adjacent the face 2' and for a distance measured inwardly therefrom slightly less than the width of the cutter blades B so as to more readily accommodate the projecting inner ends or noses of the blades, the major portions of which are disposed in slots in the cutter body as will hereinafter appear.

These blades B, of which any suitable number may be employed, are all of similar form and size and are preferably of substantially rectangular cross section thus comprising top and bottom faces 10 and 11 and end faces 12 and 13, the blades being considerably greater in width than in thickness, as clearly shown in Figs. 3 and 4. Ordinarily the blades are made of hardened alloy steel and when intended to be used in the operation of milling threads, each blade may be provided on its face 11 with a plurality of parallel grooves and ridges similar in form to the profile of the thread to be cut and extending the entire length and width of the face, the grooves on each blade being similar to those in every other blade and disposed in the same relative position with respect thereto so that when the cutter is in operation the grooves and ridges on the several blades will perfectly register or track with each other as the blades are carried about the work; but, it will, of course, be understood that if the cutter is to be used for milling plain surfaces the grooves will ordinarily be omitted or if to be used to form threads of other than V-shaped profile the grooves in the blades will be suitably adapted therefor. Conveniently, the blade may terminate at its rear end in a flat face or surface 14 while its forward end is ground to provide a suitable cutting face and for other purposes as hereinafter more particularly described.

The body 2 is provided with a plurality of slots 18 extending inwardly from the face 2' and each of suitable width to snugly contain one of the blades and in depth slightly less than the width thereof so that when a blade is disposed in a slot with the edge 12 in contact with the bottom 19 of the slot, that part of the blade adjacent the edge 13 will extend for a short distance beyond the face 2' as clearly shown in Figs. 2 and 5. The slots are not formed radially with respect to the axis of the cutter body but are disposed in the body in symmetrical angular relation with each other and in such manner that while the inner ends of the slots where they open out into the enlarged portion 5' of the central bore 5 are relatively close together, their outer ends are spaced for a considerable distance apart, the particular angle between the adjacent pairs of slots being in practice determined by, among other considerations, the thickness of the blades and the size of the cutter body and of the central bore 5, it being ordinarily desirable to provide the maximum number of slots possible and to so arrange them that when the blades are disposed therein, their noses will lie very closely together. Thus, while in the form of the invention illustrated, the angle between the adjacent slot walls is a little less than 30°, it will be understood that under other conditions and with blades of different thicknesses this angle may be increased or diminished within limits determined on one hand by the number of blade noses which can be crowded into the central aperture 5' and, on the other, by the necessity of so generally directing each blade with respect to the work that it may operate properly thereon and remove the metal by a true cutting action; thus the slots will ordinarily be so disposed that the under surface 11 of a blade when operatively positiond in any slot will lie at an angle greater than 90° and less than 180° with a line drawn from the axis of the cutter to the cutting edge of the blade irrespective of the particular adjusted position of the blade in that slot.

The extreme forward end or nose of each blade is ground to form a cutting face F lying in predetermined angular relation with the under face 11 of the blade. This angle is ordinarily determined by the kind of metal to be operated on and other conditions well understood by those familiar with the art of milling metal, but will ordinarily be in the neighborhood of 12° from a line drawn normal to the face 11. Additionally, in order to permit the employment of a relatively large number of blades in the cutter, a portion of the forward upper extremity of each blade is preferably ground off so as to form an angularly disposed surface 14' adjacent and behind the cutting face F, thus allowing the blade to be moved inwardly in its slot for a greater distance without contacting with the under face 11 of the adjacent blade than would otherwise be possible, the exact extent and angular disposition of the surface 14', being, of course, ordinarily determined by the relative assembled relation of the blades.

It will be understood that when the cutter is assembled, a cutting blade is disposed in each of the slots 18 so as to rest on the bottom 19 thereof and extend slightly above the face 2', and means are provided for moving each blade inwardly in its slot so as to bring it to properly adjusted relation with respect to the other blades and to suitable position for the proper performance of its function in the milling operation. For this purpose I preferably provide in the cutter body adjacent each slot and between its bottom 19 and flange 3, a bore 20 in axial alignment with the slot and parallel to the bottom thereof. This bore extends inwardly from the periphery of the body for a suitable distance and is then reduced in diameter, conveniently continued entirely through the body and interiorly threaded as at 21 for the reception of the inner end of an adjusting screw 22. Preferably this screw may be provided with an exteriorly cylindrical head 22' in which is a countersunk recess 23 adapted for the reception of a plug wrench by which the screw may be turned, the head being of such diameter as to be capable of entering the bore 20 when the screw is turned down for a sufficient distance. For communicating the motion of the screw to the adjacent blade I dispose about the screw and beneath its head a sleeve 25 having a radially extending dog 26 of sufficient length to project through a narrow slot 28 formed between the slot 18 and the bore 20 and to overhang and bear on the rear end 14 of the blade as clearly shown in Fig. 2, the diameter of the sleeve being such as to permit its entrance into the bore 20 when carried inwardly by the screw, while the sleeve is prevented from turning when the screw is rotated by engagement of the dog in the narrow slot 28. It will thus be apparent that when the adjusting screw is moved inwardly a corresponding movement will be imparted to the sleeve and in turn to the blade by engagement of the dog therewith and that such inward movement of the blade may be continued until arrested by contact of the sleeve with the inner end of the bore 20.

Means are also provided for rigidly and securely maintaining the blades in adjusted position in the body 2, said means preferably comprising a clamping plate 30 substantially of the diameter of the body and arranged to be secured thereto by a plurality of bolts 31 extended through the plate and into suitably threaded holes 32 formed at proper points in the body, the cylindrical heads of the bolts, recessed for the reception of a plug wrench, being preferably countersunk in the plate as at 33. The under face of the clamping plate is adapted to engage the edges 13 of the blades as they project above the face 2' of the body, so that by setting up on the bolts 31 the plate may be drawn very tightly against the blades to rigidly maintain them in any position of adjustment to which they may have been brought in the slots. In order to insure the plate being drawn snugly against all af the blades and with a similar pressure, I preferably employ a plurality of the bolts 31 and dispose one of them between each adjacent pair of blades, but other arrangements of the bolts may be utilized if desired.

Since each of the blades is independently adjustable through the medium of its adjacent adjusting screw 22, it will be apparent that after the blades are properly ground and seated in the cutter body and before they are finally locked in position by tightly setting up the bolts 31, it is requisite, in order that the milling operation may be properly performed, to so adjust the several blades that the same depth of cut will be taken by each, and while this operation may be performed in different ways, I prefer, in order to secure accuracy and rapidity of setting, to employ a form of setting gauge now to be described and most clearly shown in Fig. 9. This gauge may comprise a cylindrical body 35 adapted to snugly enter the bore 5 in the cutter and provided at one end with a conveniently integral outwardly projecting flange 36 having a plurality of curved slots 37 extending therethrough. The other end of the body is provided with a plurality of spaced, parallel, longitudinally extending grooves 39 thus forming a tooth 40 between each adjacent pair of grooves, the walls of each groove being preferably so disposed with respect to each other that each tooth will comprise a front face 40', which may be either radial or inclined slightly from a true radial direction, and a rear face 40'' disposed at a considerably greater angle so as to clear the under face 11 of the adjacent cutter blade when the gauge is being used in the operation of adjusting the blades as shown in Fig. 6.

The gauge when constructed substantially in the manner described, is adapted to be inserted in the central aperture 5 of the body and temporarily secured in position therein by bolts 42 passed through the slots 37 and extending into threaded holes 43 formed in the flange 3 at suitable intervals, and under these conditions is capable of a limited amount of relative rotation with respect to the body as determined by the length of the slots. Thus, after the gauge is inserted and the bolts 42 drawn up loosely the gauge may be rotated in the cutter either to the right or left for a short distance and may then be locked at any desired point with respect to the cutter by tightening the bolts, the flange of the gauge being conveniently provided with an index 44 and the face of the cutter with an arrow 45 to assist in bringing the gauge to a predetermined position with respect to the cutter.

In the preferred manner of performing the operation of adjusting the blades and assuming that the latter have been assembled in their respective slots and the clamping plate loosely drawn up against them, the gauge may be inserted in the central bore of the cutter and then turned to proper position with respect thereto, as conveniently indicated by the index, and locked to the cutter body by the bolts 42. The adjusting screws 20 are now consecutively operated so as to move their respective blades inwardly until their cutting faces F contact with the forward faces 40' of the gauge teeth, and as these teeth are all similar, equidistantly spaced about the gauge and equal in number to the blades in the cutter, the cutting edges of the latter, that is, the edges formed by the junction of the face 11 and the cutting face F of each blade, will all be brought into exactly the same relation and equidistantly spaced from the central axis of the cutter body so that when the cutter is rotated about the work each blade will take a cut exactly similar in depth to that taken by every other blade. The adjustment of the several blades being completed, the locking plate is drawn up into final position so as to lock the blades in the body and the setting gauge and bolts 42 removed, thus placing the cutter in condition for operation.

As the blades are preferably initially formed of sufficient length to extend for substantially the whole length of the slots when the cutting edges of the blades are adjusted to cutting position, it will be noted that the body of each blade contains a sufficient amount of stock to permit the blade to be removed from the cutter and resharpened for a great number of times before the length of the blade is decreased sufficiently to render it useless, for after each sharpening operation the blade, upon being reinserted in the cutter body, is ordinarily only projected forward sufficiently by the adjusting means to compensate for the amount which has been ground off, thereby avoiding the necessity for frequent renewal of the relatively expensive alloy steel blades.

It will further be noted that, by reason of the peculiar disposition of the blades in the cutter body and the ability to effect adjustment of the blades in their respective slots, it is possible, when desirable, to vary the clearance between the under face of each blade and the surface of the work on which it is operating or intended to operate. More particularly, and referring to Fig. 10 for purposes of illustration, it will be noted that if a given blade B, as shown in full lines in said figure, is adjusted to a position in which its cutting edge will contact at X with the surface of a piece of work W, the angle YXZ formed between the under surface of the blade and the tangent to the work at X is less than the angle Y'X'Z formed by a blade B' (shown in broken lines) contacting at X' with the surface of a piece of work W' of greater radius than the work W but concentric therewith. In other words, the surface of the work W beneath the blade B falls away therefrom more rapidly than does the surface of the work W' from the blade B', from which it will be evident that as any blade is retracted in its slot and its cutting edge thus moved further from the center of the cutter body, the clearance between the under face of the blade and the work upon which it may be caused to operate is increased and vice versa as the blade is advanced in its slot. Hence, if it be desired when adjusting the cutter blades to operate on a piece of work of given diameter to effect a relatively great clearance between the under faces of the blades and the work, the cutting edges of the blades are not advanced so far as when it is desired to effect a small clearance therebetween, with a result that it becomes thereafter necessary to move the cutter as a whole for a greater radial distance to bring the cutting edges into the work for the desired depth than is necessary when the blades by suitable adjustment are further initially projected into the bore 5. It will thus be apparent that by suitable adjustment of the blades, the clearance between their under surfaces and the adjacent surface of the work may be varied sufficiently to enable maximum efficiency of operation to be attained under different operative conditions or when milling different sorts of metal, and further that by the use of the setting gauge this adjustment may be very readily effected, since if the gauge is rotated slightly in a counter-clockwise direction when viewed as in Fig. 8, the teeth 40 of the gauge will be correspondingly advanced toward their respectively adjacent blades and thereby decrease the distance which the blades can be projected into the central aperture, while, on the other hand, if the gauge be turned in a clockwise direction, the teeth will be moved away from the blades, allowing the latter to be projected inwardly for a greater distance during the adjusting operation.

Moreover, as substantially the entire amount of metal in each blade is disposed in the rear of its cutting face and in a position to support the same and resist the thrust of the work thereon, and as the blades are clamped very rigidly in the cutter body through the medium of the clamping plate, vibration or chattering of the blades when in operation is avoided.

From the foregoing description of a preferred embodiment of my invention it will be apparent that I have provided a milling cutter embodying a plurality of independently adjustable blades operatively secured in the cutter body and so constructed and disposed therein that with a cutter of given size a maximum number of cutting edges or surfaces may be brought to bear on the work; that by suitable adjustment of the individual cutter blades their angular relation with the surface of the work may be varied and that the design of the cutter and of the blades is such as to permit the latter to be sharpened for a maximum number of times without rendering them unsuitable for use, and further that I have provided means for effecting proper and accurate adjustment of the cutter blades when required thereby enabling this operation to be performed with the requisite nicety by an ordinary mechanic and in a short period of time.

While I have herein described and illustrated with considerable particularity a preferred form of my invention as embodied in a cutter suitable for forming external threads by a milling operation and when actuated by a suitable machine, I do not thereby desire or intend to limit myself specifically to any precise design, construction or arrangement of the several elements employed nor to the use of cutter blades grooved or otherwise formed so as to produce threads or the like on the work, as numerous modifications both in the form, construction and arrangement of the several parts may be made, the number and form of blades employed may be varied or blades suitable for forming smooth surfaces instead of threads on the work may be readily utilized if desired, without departing from the spirit and scope of the invention as defined in the appended claims.

Having thus described my invention, I claim and desire to protect by Letters Patent of the United States:

1. A milling cutter comprising a solid body having a central aperture adapted to receive the work to be milled and a plurality of independent, separated cutting blades respectively arranged in separated slots in said body and projecting into said aperture, each blade having a cutting edge at the extremity of its projecting portion and being so disposed in the body as to form an angle greater than 90° and less than 180° with a line drawn from said edge to the central axis of the bore, an adjusting screw adjacent each blade but out of alignment therewith, and a dog extending between each screw and the adjacent blade and movable in the blade slot operative to cause the blade to move in correspondence with the screw when the latter is rotated.

2. A milling cutter comprising a body having a central bore adapted to receive the work to be milled and a plurality of blade receiving slots radiating outwardly therefrom each slot forming an acuate angle with the adjacent slots whereby the inner ends of said slots are closely adjacent and the outer ends more widely separated, a cutter blade partially disposed in each slot, means for effecting independent adjustment of each blade in its slot to project the inner end thereof into said bore, and means arranged for simultaneous engagement with all of the blades for rigidly securing all of said blades in their respective slots after they have been disposed in any desired position of adjustment.

3. A machine as specified in claim 2 and in which each blade is provided with an angularly disposed surface adjacent its inner end and lying in proximity and substantially parallel to the face of an adjacent blade.

4. A milling cutter comprising a body having a central bore adapted to receive the work to be milled and a plurality of blade receiving slots radiating outwardly therefrom and extending from the bore to the exterior of the body, the inner ends of said slots adjacent said bore being disposed very closely to each other and the outer ends of the slots at the periphery of the body being relatively widely separated, a cutter blade disposed in each slot and adapted when resting on the bottom thereof to extend beyond the end of the body, a clamping plate adapted to engage the cutters, and means for securing the clamping plate to the body so as to clamp the cutters in their respective slots.

5. A milling cutter as specified in claim 4 and embodying means for effecting adjustment of the individual cutters in their respective slots prior to their being operatively clamped therein.

6. A milling cutter as specified in claim 4 and comprising an adjusting screw extending into the body adjacent and parallel to each slot, and means carried by each screw and adapted to engage the outer end of the adjacent blade in the adjacent slot to move the blade therein in correspondence with the movement of the screw prior to the blade being operatively clamped in the slot.

7. A milling cutter comprising a body having a central bore adapted to receive the work to be milled and a plurality of cutting blades positioned in angularly disposed slots formed in said body, the inner end of each blade projecting into said bore and being provided with an angularly disposed surface lying adjacent but out of contact with the preceding blade when the blades are assembled in operative position in the body.

8. A milling cutter comprising a body having a central bore adapted to receive the work to be milled and a plurality of removable cutting blades angularly positioned in the body and projecting into said bore, one face of each blade being provided with a plurality of parallel grooves and ridges and the inner end of the blade adjacent said face being ground to provide a cutting surface, the blade adjacent said surface being provided with an angularly disposed surface arranged to lie in proximity to but spaced from the grooved surface of the preceding blade when the blades are assembled in operative position in the body.

9. A milling cutter comprising a body having a central bore adapted to surround the work to be milled and a plurality of independently adjustable cutting blades arranged in said body to partially project into said bore and so disposed with respect to said bore and to each other that the angle between each blade and the tangent to the work at the cutting point may be varied by moving the blade in or out with respect to said bore.

10. A milling cutter comprising a body having a central bore adapted to surround the work to be milled and a plurality of independently adjustable cutting blades extending into said bore and each provided with a cutting edge at its inner extremity formed by the intersection of one face of the blade and a cutting surface angularly disposed with respect thereto, said blades being so disposed with respect to said bore and to each other that the angle between the said face of each blade and the tangent to the surface of the work at the point of contact of the cutting edge of the blade therewith may be varied in correspondence with the amount that the blade is projected into said bore.

11. A milling cutter comprising a body having a central bore adapted to surround the work to be milled and a plurality of independently adjustable cutting blades extending into said bore, each blade having a cutting edge at its forward extremity and a surface extending rearwardly from said edge, the blades being so disposed with respect to each other and to said bore that the clearance between the surface of the work in the rear of the cutting point and the adjacent rearwardly extending surface of any blade when its cutting edge is in contact with the work may be varied in correspondence with the extent to which the blade is projected into the bore.

12. A milling cutter comprising a body having a central bore adapted to surround the work to be milled and a plurality of independently adjustable cutting blades extending into said bore, each blade having a cutting edge at its forward extremity and a surface extending rearwardly from said edge, the blades being so disposed with respect to each other and to said bore that the clearance between the surface of the work in the rear of the cutting point and the adjacent rearwardly extending surface of any blade when its cutting edge is in contact with the work may be diminished by projecting the blade further into the bore or increased by retracting the blade with respect to the bore.

13. A milling cutter blade comprising a plane upper surface and a groove and ridged under surface, a plane surface disposed at one end of the blade and intersecting said under surface to form a cutting edge and an angularly disposed surface extending between the other end of said plane surface and the upper surface of the blade.

14. A milling cutter blade comprising parallel end surfaces and parallel upper and lower surfaces the latter provided with a plurality of parallel grooves and ridges and said blade being ground at one extremity to provide a plane cutting surface intersecting and angularly disposed with respect to said lower surface, and a plane surface connecting said cutting surface and said upper surface and angularly disposed with respect to both of said surfaces and said lower surface.

In witness whereof, I have hereunto set my hand this 21st day of February, 1923.

PETER P-G. HALL.